L. DETTRICK.
PLOW ATTACHMENT.
APPLICATION FILED OCT. 4, 1909.
962,893.
Patented June 28, 1910.
2 SHEETS—SHEET 1.
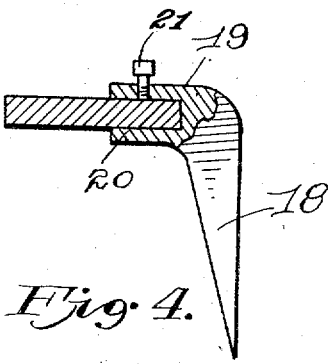
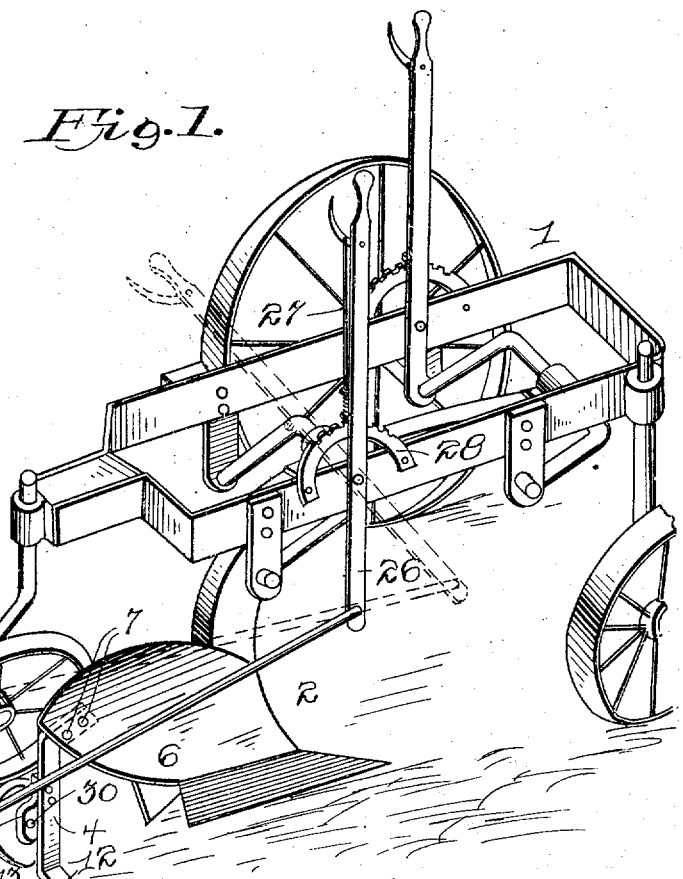
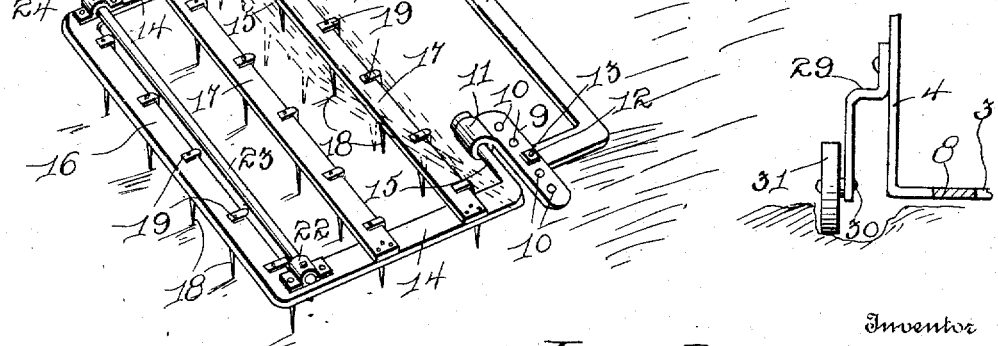
Inventor
Leo Dettrick.

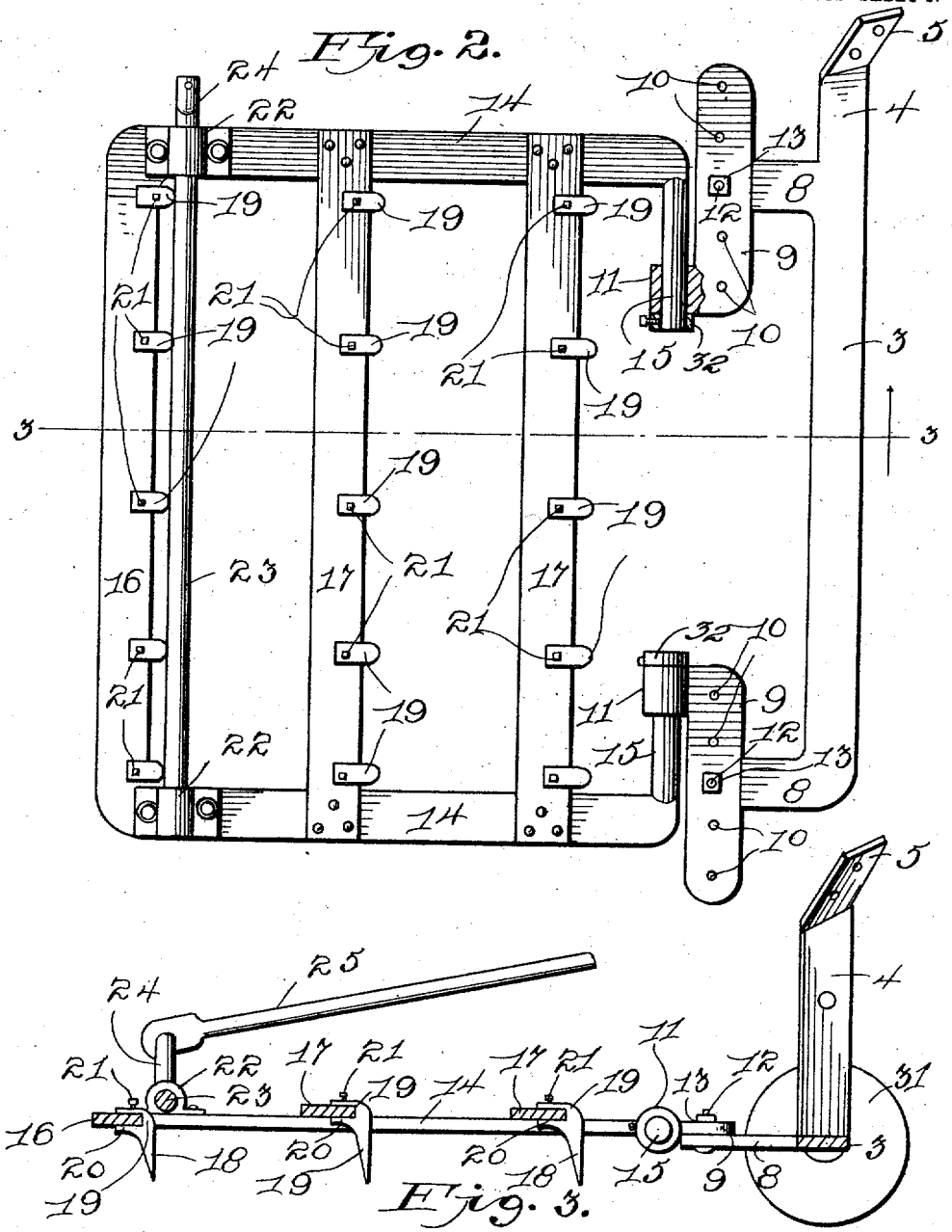

UNITED STATES PATENT OFFICE.

LEO DETTRICK, OF STICKNEY, SOUTH DAKOTA.

PLOW ATTACHMENT.

962,893.      Specification of Letters Patent.      Patented June 28, 1910.

Application filed October 4, 1909. Serial No. 520,771.

*To all whom it may concern:*

Be it known that I, LEO DETTRICK, a citizen of the United States of America, residing at Stickney, in the county of Aurora and State of South Dakota, have invented certain new and useful Improvements in Plow Attachments, of which the following is a specification, reference being had therein to the accompanying drawing.

This invention relates to earth pulverizers and the principal object of the same is to provide a pulverizer adapted to be adjustably attached to a plow or other machine so that the earth turned up by the plow will be acted upon by the pulverizer and all clods, etc., will be finely broken.

In carrying out the object of the invention generally stated above, it will be understood, of course, that the essential features of the same are necessarily susceptible of changes in details and structural arrangements, but a preferred and practical embodiment thereof is shown in the accompanying drawing wherein—

Figure 1 is a perspective view of a wheel plow showing the improved pulverizer or clod crusher attached thereto. Fig. 2 is a top plan view of the improved pulverizer, partly in section, and detached from the plow. Fig. 3 is a vertical sectional view taken on the line 3—3, Fig. 2. Fig. 4 is a detail view, partly in section, showing the manner of detachably connecting the teeth of the pulverizer. Fig. 5 is a detail view of a supporting roller for the pulverizer.

Referring to said drawing by numerals, 1 designates the wheeled frame which has the plow 2 adjustably mounted thereon. The improved pulverizer or clod crusher is supported by a frame composed of a bar 3 which is held in a horizontal position by means of a vertically arranged upturned hanger end portion 4 which terminates in an angularly projected end 5 detachably held in engagement with the moldboard 6 of the plow 2 by means of the bolts 7. Said bar 3 is provided with an arm 8 at each end portion, said arms projecting laterally from said bar and arranged in the same plane. A flat bar 9 provided with bolt holes 10, and with an outstanding bearing 11 at one end is adjustably held on each arm by means of the bolts 12 and nuts 13. Said pulverizer or clod crusher is composed of a substantially rectangular frame, the side bars 14 of which have their forward end inturned and rounded as indicated at 15 to provide rocker shafts which are mounted in said bearings 11. Said side bars are connected at their rear end by means of the rear bar 16, said side bars and rear bars being preferably integral. The side bars are also connected intermediate their ends by means of spaced apart cross bars 17.

The teeth 18 of the pulverizer have their penetrating portion tapering and their upper end bent at right angles, as indicated at 19, and provided with a longitudinally bifurcated portion 20 which is adapted to engage over the longitudinal edges of the bars 16 and 17 and be adjustably and detachably held thereon by means of the set screw 21.

The side bars 14 carry alined bearings 22 on their upper surfaces and preferably adjacent their rear end in which a shaft 23 is mounted. The inner end of said shaft 23 projects beyond its bearing and is bent at an angle to form a crank 24 which is connected to one end of a rod 25 the other end of which is connected to the lower portion of a hand lever 26 pivotally mounted on the plow frame 1 and provided with a hand-controlled pawl 27 adapted for engagement with a rack 28 carried by said frame.

As an additional support for the pulverizer supporting frame, the hanger end portion 4 on the inner side carries a pendent bracket bearing 29 in which a shaft 30 is mounted and carries a roller 31. Said roller is arranged so that it will run in the groove or furrow made by the plow.

The shafts 15 of the pulverizer project through their bearings 11 and have collars 32 detachably and adjustably mounted on their end to retain said shafts within said bearings.

It will be seen from the foregoing that the improved pulverizer or clod crusher is arranged relative to the plow frame so that it will drag behind and to one side of the same so that it will be in position to crush the material previously turned by the plow. Through the described pivotal connection of the pulverizer or clod crusher with its supporting frame, and the shaft and rod connection with the plow frame, the pulverizer may be adjusted to correspond with the adjustment of the plow, and also may be raised entirely from the ground when necessary or desirable.

What I claim as my invention is:—

1. A device of the character described comprising a body-portion adapted to be secured to a plow, arms formed integral with said body-portion, socket pieces adjustably secured to said arms, and a harrow pivotally mounted on said socket pieces.

2. A device of the character described comprising a body-portion terminating in an upstanding angled piece adapted to be secured to the mold-board of a plow, arms extending from said body-portion, and cross pieces adjustably mounted on said arms, said cross pieces terminating in angled portions forming sockets adapted to receive the ends of a harrow.

3. A device of the character described comprising a body-portion terminating in an upstanding end portion, arms extending rearwardly from said body-portion, socket pieces adjustably mounted upon said arms, an angled piece secured to said end portion, and a supporting roller mounted upon said angled piece.

4. A device of the character described comprising a body-portion, said body-portion terminating in an upstanding portion adapted to be secured to a plow, a pair of arms extending rearwardly from said body-portion, one of said arms at the outer end of said body, the other of said arms being located near said upturned portion, and socket pieces secured to said arms.

In testimony whereof I hereunto affix my signature in presence of two witnesses.

LEO DETTRICK.

Witnesses:
EARL HOLLY,
W. P. THOMPSON.